United States Patent [19]

Ohya et al.

[11] Patent Number: 5,344,854
[45] Date of Patent: Sep. 6, 1994

[54] FRICTION MATERIAL FOR BRAKE

[75] Inventors: Kazuyuki Ohya; Norio Sayama, both of Tokyo, Japan

[73] Assignee: Mitsubishi Gas Company, Inc., Tokyo, Japan

[21] Appl. No.: 16,142

[22] Filed: Feb. 5, 1993

[30] Foreign Application Priority Data

Feb. 7, 1992 [JP] Japan ................... 4-022827

[51] Int. Cl.$^5$ .............................. C08J 5/14
[52] U.S. Cl. ................... 523/149; 523/152; 523/153; 523/155; 524/424; 524/413; 524/425; 524/431; 524/436; 524/486
[58] Field of Search ............... 523/149, 152, 153, 155; 524/424, 413, 425, 431, 436, 486

[56] References Cited

U.S. PATENT DOCUMENTS 4,944,373  7/1990  Ohya et al. ............ 188/251 A
4,954,536  9/1990  Komori et al. ............ 523/149

FOREIGN PATENT DOCUMENTS 0344778   6/1989   European Pat. Off. .
63-219924  9/1988  Japan .
63-310770 12/1988  Japan .
2217725   4/1989   United Kingdom .

*Primary Examiner*—Paul R. Michl
*Assistant Examiner*—John J. Guarriello
*Attorney, Agent, or Firm*—Browdy and Neimark

[57] ABSTRACT

A friction material for a brake obtained by a process which comprises preparing (I) a composition for a friction material from (A) a binder composition comprising 95–5 parts by weight of a cyanate ester resin and 5–95 parts by weight of a polycyclic aromatic pitch, (B) a fiber reinforcing substrate, and (C) a friction and wear regulator, thermoforming the composition (I) by hot pressing to cure the binder composition (A), and heat-treating the cured product at a temperature of 270°–800° C. to cyclize or semi-carbonize the binder composition (A) is disclosed which has markedly improved anti-fade properties.

12 Claims, No Drawings

FRICTION MATERIAL FOR BRAKE

FIELD OF THE INVENTION

The present invention relates to a friction material for a brake or clutch of an automobile or the like. More particularly, the invention relates to a friction material for a brake which has markedly improved anti-fade properties and which can be preferably used as a pad for a disk brake using a cast iron rotor.

BACKGROUND OF THE INVENTION

Nowadays, a high power engine and increased fuel efficiency are required of an automobile or the like. Because of these requirements in performance as well as design, demand is becoming stronger for higher-performance and smaller-size parts including brakes clutches and so on. For example, requirements for a disk brake are that it be serviceable when exposed for a short time to much higher temperatures than before (e.g. maximum temperature of the cast iron rotor, about 900° C.), that it should have anti-fade properties at such elevated temperatures from the viewpoint of safety, and that its life be long.

The limits of heat resistance of a friction material for use in disk brakes or clutches are governed mainly by the heat resistance of a binder resin contained therein. The service temperatures of the disk brakes, however, greatly surpass the limits of the heat resistance of conventional binder resins such as phenolic resins.

The proposals made as solutions to this problem were a friction material for a brake which was produced by hot-pressing a friction material containing a binder of bulk mesophase carbon at a temperature of 400°–650° C. followed by semi-carbonizing it (Japanese Laid-Open Patent Publication No. 219924/1988); and a method of treating the so obtained friction material for a brake at a temperature of 1050°–1150° C. under a hydrogen atmosphere (Japanese Laid-Open Patent Publication No. 310770/1988). The friction materials produced by these contrivances had good anti-fade properties, but were still problematical in terms of durability.

SUMMARY OF THE INVENTION

The object of the present invention is to provide a friction material for a brake which has anti-fade properties at high temperatures and has a long life.

The present invention relates to a friction material for a brake obtained by a process which comprises preparing (I) a composition for a friction material from (A) a binder composition comprising 95–5 parts by weight of a cyanate ester resin and 5–95 parts by weight of a polycyclic aromatic pitch, (B) a fibrous reinforcing substrate, and (C) a friction and wear regulator, thermoforming the composition (I) by hot pressing to cure the binder composition (A), and heat-treating the cured product at a temperature of 270°–800° C. to cyclize or semi-carbonize the binder composition (A).

The preferred embodiments of the present invention are as follows:

(1) The composition (I) for a friction material comprises 5–20 parts by weight of the binder composition (A), 25–70 parts by weight of the fibrous reinforcing substrate (B), and 15–60 parts by weight of the friction and wear regulator (C).

(2) The binder composition (A) comprises 80–30 parts by weight of a cyanate ester resin and 20–70 parts by weight of a polycyclic aromatic pitch.

(3) The fibrous reinforcing substrate (B) is one or more materials selected from the group consisting of steel fiber, steel fiber having an $Fe_3O_4$ film formed on the surface thereof, copper fiber, copper fiber having a CuO film formed on the surface thereof, carbon fiber produced at a final calcination temperature of 1100° C. or lower, rock wool, and ceramic fiber.

(4) The friction and wear regulator (C) is one or more agents selected from the group consisting of barium sulfate, graphite, calcium carbonate, molybdenum sulfide, calcium fluoride, and cured resin dust.

(5) The heat treatment is performed at a temperature of 270°–350° C. under an inert gas atmosphere to cyclize the binder composition (A). In this case, the friction and wear regulator (C) contains a cured resin dust obtained by curing a composition comprising an aromatic hydrocarbon-modified novolak type epoxy resin and a cyanate ester resin, and grinding the cured product.

(6) Alternatively, the heat-treatment is performed under an inert gas atmosphere while raising the temperature to up to 400°–800° C., thereby to semi-carbonize the binder composition (A). In this case, the friction and wear regulator (C) contains no cured resin dust.

DETAILED DESCRIPTION OF THE INVENTION

The construction of the present invention will be described below.

The binder composition (A) comprises a cyanate ester resin and a polycyclic aromatic pitch at a weight ratio of 95:5 to 5:95, preferably 80:20 to 30:70. If the binder composition (A) is to be cyclized, this weight ratio should be 75/25 to 50/50. If it is to be semi-carbonized, the weight ratio should be 60/40 to 30/70. If its cyanate ester resin content is too low, its adhesion to the fibrous reinforcing material and so forth will become poor, thus resulting in inferior strength. If the cyanate ester resin content is too high, there will be an excess of a gas component consisting mainly of hydrogen which is to be removed during cyclization or semi-carbonization. This will also lead to a low strength.

The binder composition (A) is prepared either by mixing a powder of a cyanate ester resin and a powder of a polycyclic aromatic pitch, or by melt-mixing these powders to form a homogeneous mixture, and then grinding the homogeneous mixture. Particularly when the cyanate ester resin component accounts for 50 wt. % or less of the binder composition (A), it is preferred to melt-mix said powders and grind the resulting homogeneous mixture. The melt-mixing is performed at a temperature of not lower than the melting point of at least the cyanate ester resin but not higher than 230° C. The resulting homogeneous mixture is usually cooled to room. temperature (25° C.) or lower, and then ground to form the binder composition (A).

The cyanate ester resin consists essentially of a polyfunctional cyanate ester, a prepolymer of the polyfunctional cyanate ester, or the like. This resin includes, for example, cyanate resins (Japanese Patent Publication Nos. 1928/1966, 11712/1970 and 1222/1969, German Patent No. 1190184), cyanate ester-maleimide resins, cyanate ester-maleimide-epoxy resins (Japanese Patent Publication Nos. 30440/1979 and 31279/1977, U.S. Pat. No. 4,110,364), and cyanate ester-epoxy resin (Japanese Patent Publication No. 41112/1971).

Examples of the cyanate ester are 1,3- or 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyanatophenyl)propane; 2,2-bis(3,5-dibromo-4-cyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; cyanate ester obtained by the reaction of a terminal hydroxyl group-containing polycarbonate oligomer with a cyanogen halide (U.S. Pat. No. 4,026,913); and cyanate esters obtained by the reaction between novolaks and cyanogen halides (U.S. Pat. No. 4,022,755 and U.S. Pat. No. 3,448,079).

Examples of the maleimide component are organic compounds containing one or more N-maleimide groups in the molecule, prepolymers of the organic compounds, etc. Examples of the epoxy resin are organic compounds containing two or more epoxy groups in the molecule, prepolymers thereof, etc. These compounds are exemplified in the above-mentioned publications. The preferred proportion of the maleimide component is 20–60 wt. %, particularly 30–40 wt. %, based on the cyanate ester component. The preferred proportion of the epoxy resin is 5–20 wt. % based on the cyanate ester component.

A polycyclic aromatic pitch includes, for example, pitch obtained by heat-polymerizing a heavy oil or tar from petroleum or coal; and pitch synthesized from an aromatic hydrocarbon by using catalyst such as $HF/BF_3$ or $AlCl_3$. These pitches contain an optically anisotropic phase and an optically isotropic phase at an arbitrary ratio, and have a softening point of 150°–300° C. In the present invention, the pitch has a softening point of 150°–230° C., preferably 170°–200° C. Too low a softening point is not preferred, because the compound to be cyclized or semi-carbonized will be removed from the resulting friction material before its cyclization or semi-carbonization. Too high a softening point will lead to difficulty in producing a homogeneous mixture with the cyanate ester resin. It will also cause an increased viscosity, and thus poor formability, and eventually giving an inhomogeneous product.

The fibrous reinforcing substrate (B) of the invention includes, for example, inorganic or metallic fibers. Examples are steel fiber; steel fiber having an $Fe_3O_4$ film formed on the surface thereof; copper or copper alloy fiber; copper fiber having a CuO film formed on the surface thereof; carbon fiber formed at a final calcination temperature of 1100° C. or lower; rock wool; ceramic fiber; and potassium titanate fiber. Normally, two or more of these fibers are used in combination. Preferably, rock wool fiber, steel fiber, copper fiber, and carbon fiber formed at a final calcination temperature of 1100° C. or lower (the one which has not been completely graphitized) are mainly used.

The above fibrous reinforcing substrate can be used preferably after undergoing surface treatment with the cyanate ester resin for use as a component of said binder composition, or after undergoing a treatment which provides a stabler surface such as that of the steel fiber having an $Fe_3O_4$ film on the surface thereof or the copper fiber having a CuO film formed on the surface thereof.

Examples of the friction and wear regulator (C) according to the invention are barium sulfate, graphite, calcium carbonate, molybdenum disulfide, calcium fluoride, cured resin powder, alumina, silica, short fiber of glass, short fiber of rock wool, mullite, metallic powder or tip of copper, brass, bronze, iron, zinc or tin, copper oxide, antimony trioxide, zirconium oxide, and ferric oxide. Suitable combinations of any of these materials achieve the functions of stabilizing the coefficient of friction at low to high temperatures, imparting wear resistance, preventing fade at elevated temperatures, and making the disk surface clear.

When, in the production of the friction material of the invention, heat treatment is to be performed until cyclization occurs, the preferred friction and wear regulator is one containing a heat-resistant cured resin dust serviceable at a temperature of up to about 400° C., such as a cured resin dust prepared by curing a composition comprising an aromatic hydrocarbon-modified novolak type epoxy resin and a cyanate ester resin, especially, at 90:10 to 60:40, and then grinding the cured product. When the heat treatment is intended for semi-carbonization, the friction and wear regulator is preferably a stable material which does not contain the above-mentioned cured resin dust.

The composition (I) for the friction material in accordance with the present invention consists essentially of the above-described components. It may also contain a known curing catalyst for the binder component (A), a parting agent for forming, and so forth. Preferred examples of the curing catalyst for Component A are organic metal salts, organic metal chelates, inorganic metal salts, and organic peroxides.

Examples of the organic metal salts and organic metal chelate compounds are zinc naphthenate, lead stearate, zinc octylate, tin oleate, dibutyltin maleate, manganese naphthenate, cobalt naphthenate, iron acetylacetonate, and manganese acetylacetonate. Examples of the organic peroxides are benzoyl peroxide, lauroyl peroxide, capryl peroxide, acetyl peroxide, p-chlorobenzoyl peroxide, and di-tert-butyl-di-perphthalate. The amount of the curing catalyst may be within the ordinary range for the amount of a catalyst. For instance, it is used in the range of 0.01–5% by weight.

The above-mentioned Components A, B and C, and if desired, a parting agent and the curing catalyst for Component A are uniformly mixed by means of a blender, Eirich mixer, Banbury mixer, Redicke mixer, or Henschel mixer, or other means, thereby to prepare the composition (I) for the friction material of the present invention.

This composition (I) for the friction material is hot-pressed at a temperature of 150°–250° C., preferably 180°–230° C., at a pressure of 100–2,000 kg/cm² to cure the binder composition (A) and produce a formed product. The formed product is usually withdrawn from the hot press and postcured at a temperature of 200°–270° C. for satisfactory workability.

The product is further heat-treated at a temperature of 270°–800° C. to prepare a friction material for a brake in accordance with the present invention.

Between the pressure for producing the formed product having the binder composition (A) cured, and the flexural strength or the depth of wear after heat treatment, there tends to be such relationship that the higher this pressure, the higher this strength or the smaller this depth of wear, thus affording a better product. Even a high pressure of less than 1,000 kg/cm² in customary use will permit the production of a fully satisfactory friction material for a brake. To obtain the intended friction material with higher performance, however, it is preferred to make the formed product at a higher pressure.

The so obtained formed product is then heat-treated. The heat treatment in the present invention is typically performed by a method which will attain cyclization or semi-carbonization of the binder composition (A).

The former method of heat treatment for cyclization is carried out at a temperature of 270°–350° C. under an inert gas atmosphere for a period of time selected from 1 to 24 hours, preferably 2 to 10 hours. Preferably, a time should be selected which will cause little weight loss of the formed product.

The latter method of heat treatment for semi-carbonization is performed preferably under an inert gas atmosphere while raising the temperature to up to a final temperature of 400°–800° C. preferably 550°–800° C., over the course of 5–100 hours, preferably 10–30 hours. If a metallic fiber such as steel fiber, copper fiber or brass fiber, or a metallic powder such as copper powder is contained as a component, semi-carbonization is sufficiently achieved in 5–24 hours. Furthermore, the semi-carbonization of the present invention is preferably carried out subsequently to the above-mentioned cyclization performed at 270°–350° C. If desired, this method may be followed by impregnating the semi-carbonized product with a melt of the binder composition, and then semi-carbonizing the impregnated product, in order to impart a further increased strength.

The friction material for a brake as obtained above is normally used mounted to a disk brake or other substrate by adhesion.

When it is to be used for disk brake pads, for instance, the surface of an iron or other substrate processed to a predetermined shape is polished by shot blasting or the like for the purpose of adhesion. The polished surface is coated with a heat-resistant adhesive composition, and the friction material for a brake in accordance with the present invention is press-bonded with heating to that surface. In order to enhance the bonding strength, the substrate may be provided with a hole or the like, if desired.

The present invention will be described in more detail by way of the following examples, in which all parts and percentages are on a weight basis, unless otherwise specified.

EXAMPLES

Example 1

To 70 parts of cyanate ester-maleimide resin (BT-2480, a product of Mitsubishi Gas Chemical Co., Inc.; powder of 120 mesh) and 30 parts of a polycyclic aromatic pitch with a softening temperature of 180° C. (a product obtained by heat-polymerizing naphthalene using $HF/BF_3$ as a catalyst) were added 0.05 part of iron acetylacetonate and 0.5 part of dicumyl peroxide as catalysts. These materials were uniformly ground and mixed in a ball mill to obtain a binder composition (A1).

12 Parts of the binder composition (A1), 50 parts of steel fiber, 10 parts of barium sulfate, 8 parts of copper powder, 18 parts of graphite powder, and 2 parts of BT dust (a grind of a cured composition comprising xylene resin-modified novolak type epoxy resin/cyanate ester resin=7/3) were uniformly mixed by means of a Redicke mixer to form a composition (I) for a friction material.

The composition (I) was thermoformed for 25 minutes at a pressure of 550 $kg/cm^2$ and a temperature of 180° C. Then, it was postcured for 6 hours at a temperature of 230° C. to obtain a formed product for a semimetallic disk brake containing the binder composition (A1) completely cured (control).

The resulting formed product was further subjected to each of a method involving heat treatment for 6 hours at 300° C. under $N_2$ atmosphere, and a method of heat treatment comprising raising the temperature to 550° C. over the course of 7 hours and keeping this temperature for 1 hour. Thereby were prepared friction materials for brakes in accordance with the present invention.

The resulting friction materials for a brake were measured for the weight loss based on the binder resin (A) after heat treatment (% weight loss), flexural strength at room temperature, friction and wear properties (coefficient of friction, depth of wear, state of rotor surface). The results are shown in Tables 1 and 2.

For friction and wear tests (*1) in Table 2, pads having the friction material for a brake were applied to a disk rotor set at a temperature of 550° C. under the following brake test conditions: 200 brake operations were performed at an initial speed at brake of 160 km/hour and a deceleration rate during brake of 0.6G with a moment of inertia of 5 kg $fms^2$. After these braking tests, the depth of wear of the friction material was measured, and the surface of the rotor was evaluated.

Example 2

To 50 parts of cyanate ester-maleimide resin (BT-2300, a product of Mitsubishi Gas Chemical Co., Inc.) and 50 parts of a polycyclic aromatic pitch with a softening temperature of 180° C. (a product obtained by heat-polymerizing naphthalene using $HF/BF_3$ as a catalyst) were added 0.1 part of iron acetylacetonate and 0.5 part of dicumyl peroxide as catalysts. These materials were melt-blended for 10 minutes at a temperature of 110° C. by means of a heating kneader. Then, the blend was cooled and ground to obtain a binder composition (A2).

12 Parts of the binder composition (A2), 20 parts of pitch carbon fiber, 20 parts of copper fiber, 10 parts of ceramic fiber (a product of Toshiba Monoflux), 18 parts of graphite powder, and 20 parts of barium sulfate were uniformly mixed by means of a Redicke mixer to form a composition (I) for a friction material.

The composition (I) was thermoformed for 30 minutes at a pressure of 380 $kg/cm^2$ and a temperature of 180° C. Then, it was postcured for 6 hours at a temperature of 230° C. to obtain a formed product for a semimetallic disk brake containing the binder composition (A2) completely cured (control).

The resulting formed product was further subjected to each of a method involving heat treatment for 6 hours at 300° C. under $N_2$ atmosphere, and a method of heat treatment comprising raising the temperature to 550° C. over the course of 7 hours and keeping this temperature for 1 hour. Thereby were prepared friction materials for brakes in accordance with the present invention.

The resulting friction materials for a brake were measured for the weight loss based on the binder resin (A) after heat treatment (% weight loss), flexural strength at room temperature, coefficient of friction, and depth of wear. The results are shown in Tables 1 and 2.

TABLE 1

Flexural strength, coefficient of friction, etc.

| | Final heat treatment temp. | Weight loss (%) | Flexural strength kg/mm² | Temperature (°C.)/ Coefficient of friction | | | | | |
|---|---|---|---|---|---|---|---|---|---|
| | | | | 100 | 200 | 300 | 400 | 500 | 600 |
| Ex. 1 | 230° C. only | — | 6.5 | 0.42 | 0.43 | 0.40 | 0.33 | 0.28 | 0.21 |
| " | 230° C. + 300° C. | 2.9 | 6.1 | 0.44 | 0.46 | 0.47 | 0.45 | 0.41 | 0.39 |
| " | 230° C. + 550° C. | 12.0 | 4.2 | 0.41 | 0.42 | 0.44 | 0.45 | 0.46 | 0.46 |
| Ex. 2 | 230° C. only | — | 5.3 | 0.36 | 0.38 | 0.37 | 0.33 | 0.27 | 0.20 |
| " | 230° C. + 300° C. | 1.6 | 5.1 | 0.38 | 0.38 | 0.40 | 0.39 | 0.36 | 0.34 |
| " | 230° C. + 550° C. | 6.8 | 4.8 | 0.34 | 0.35 | 0.37 | 0.39 | 0.40 | 0.39 |

TABLE 2

Wear tests at disk temperature of 550° C.

| | Final heat treatment temperature | Depth of wear (mm) | State of disk surface |
|---|---|---|---|
| Ex. 1 | 230° C. only | 2.42 | Rough rotor surface |
| " | 230° C. + 300° C. | 1.51 | No abnormalities |
| " | 230° C. + 550° C. | 0.93 | " |
| Ex. 2 | 230° C. only | 3.10 | " |
| " | 230° C. + 300° C. | 1.93 | " |
| " | 230° C. + 550° C. | 1.15 | " |

EFFECTIVENESS OF THE PRESENT INVENTION

As will be obvious from the above detailed description of the invention and the Examples, the friction material for a brake of the present invention has a coefficient of friction substantially unchanged at temperatures of 100°-600° C., is substantially fade-free, and has a low strength as well as a small depth of wear.

Therefore, the friction material for a brake in accordance with the present invention enables a long-life, high-safety, high-performance disk brake to be provided. It is of a paramount industrial significance.

What is claimed is:

1. A friction material for a brake obtained by a process which comprises
   preparing (I) a composition for a friction material from (A) a binder composition comprising 95-5 parts by weight of a cyanate ester resin and 5-95 parts by weight of a polycyclic aromatic pitch, (B) a fibrous reinforcing substrate material consisting mainly of one or more materials selected from the group consisting of steel fiber, steel fiber having an $Fe_3O_4$ film formed on the surface thereof, copper fiber, copper alloy fiber, copper fiber having a CuO film formed on the surface thereof, carbon fiber produced at a final calcination temperature of 1100° C. or lower, rock wool, and ceramic fiber, and (C) a friction and wear regulator consisting mainly of one or more agents selected form the group consisting of barium sulfate, carbon graphite, calcium carbonate, molybdenum sulfite, calcium fluoride, and cured resin dust
   thermoforming the composition (I) by hot-pressing to cure the binder composition (A), and
   heat-treating the cured product at a temperature of 270°-800° C. to cyclize or semi-carbonize the binder composition (A).

2. The friction material of claim 1 wherein the composition (I) for a friction material comprises 5°20 parts by weight of the binder composition (A), 25-70 parts by weight of the fibrous reinforcing substrate (B), and 15-60 parts by weight of the friction and wear regulator (C).

3. The friction material of claim 1 wherein the binder composition (A) comprises 80-30 parts by weight of a cyanate ester resin and 20-70 parts by weight of a polycyclic aromatic pitch.

4. The friction material of claim 1 wherein the polycyclic aromatic pitch has a softening point of 150°-230° C.

5. The friction material of claim 1 wherein the heat treatment is performed at a temperature of 270°-350° C. under an inert gas atmosphere to cyclize the binder composition (A).

6. The friction material of claim 5 wherein the friction and wear regulator (C) contains a cured resin dust obtained by curing a composition comprising an aromatic hydrocarbon-modified novolak type epoxy resin and a cyanate ester resin, and grinding the cured product.

7. The friction material of claim 1 wherein the heat treatment is performed under an inert gas atmosphere while raising the temperature to up to a final temperature of 400°-800° C., thereby to semi-carbonize the binder composition (A).

8. The friction material of claim 7 wherein the friction and wear regulator (C) contains no cured resin dust.

9. A friction material according to claim 4 wherein said polycyclic aromatic pitch has a softening point of 170°-200° C.

10. A friction material according to claim 1 comprising at least two of said fibrous reinforcing substrate materials.

11. A friction material according to claim 10 wherein said fibrous reinforcing substrate materials comprise at least one of rock wool fiber, steel fiber, copper fiber and carbon fiber formed at a final calcination temperature of 1100° C. or lower.

12. In a friction material for a brake comprising (A) a binder composition, (B) a fibrous reinforcing substrate material, and (C) a friction and wear regulator, the improvement wherein said binder consists essentially of a cyclized or semi-carbonized binder composition of 95-5 parts by weight of a cyanate ester resin and 5-95 parts by weight of a polycyclic aromatic pitch having a softening point of 150°-230° C.

* * * * *

UNITED STATES PATENT AND TRADEMARK OFFICE
CERTIFICATE OF CORRECTION

PATENT NO. : 5,344,854
DATED : Sep. 6, 1994
INVENTOR(S) : Kazuyuki Ohya et al.

It is certified that error appears in the above-identified patent and that said Letters Patent is hereby corrected as shown below:

Cover page, column 1, line [73], after "Gas" insert --Chemical--.

Signed and Sealed this

Thirteenth Day of October 1998

*Attest:*

*Attesting Officer*

BRUCE LEHMAN

*Commissioner of Patents and Trademarks*